United States Patent [19]

Barnes et al.

[11] 4,106,562

[45] Aug. 15, 1978

[54] WELLHEAD APPARATUS

[75] Inventors: Michael L. Barnes, Sebastopol; Olin D. Whitescarver, Santa Rosa, both of Calif.

[73] Assignee: Union Oil Company of California, Brea, Calif.

[21] Appl. No.: 797,176

[22] Filed: May 16, 1977

[51] Int. Cl.² .............................................. E21B 43/00
[52] U.S. Cl. ................................... 166/97; 166/75 R; 166/205; 166/227
[58] Field of Search .................... 166/97, 75, 205, 227; 138/41; 137/544, 546; 210/435, 448

[56] References Cited

U.S. PATENT DOCUMENTS

| 834,431 | 10/1906 | Williams | 210/448 |
|---|---|---|---|
| 854,738 | 5/1907 | Hass | 210/448 |
| 1,112,117 | 9/1914 | Carbis | 137/544 |
| 1,140,720 | 5/1915 | Simons | 210/435 |
| 2,418,247 | 4/1947 | Dalzell | 210/448 |
| 2,855,048 | 10/1958 | Jones | 166/91 |

Primary Examiner—James A. Leppink
Attorney, Agent, or Firm—Richard C. Hartman; Dean Sandford; Daniel R. Farrell

[57] ABSTRACT

Wellhead flow control apparatus for controlling the flow of fluids from a well producing fluids and debris including a novel device for separating and accumulating the debris. The device comprises an outer shell defining an enclosed accumulation chamber, a perforated outlet conduit communicating with the chamber to allow the passage of fluids but prevent passage of debris, and access means to facilitate periodic removal of the accumulated debris. The wellhead apparatus is especially useful for flow control of fluids from geothermal steam wells.

12 Claims, 2 Drawing Figures

WELLHEAD APPARATUS

BACKGROUND OF THE INVENTION

1. Field of the Invention

This invention relates to wellhead apparatus, and in particular to apparatus for controlling the flow of fluids from a producing well.

2. Description of the Prior Art

The flow control of fluids from a producing well is complicated where debris is produced with the fluids. The debris, such as formation solids, pieces of well casing or well hardware and scale or corrosion products, also cause problems in other downstream equipment. Solids produced at a high velocity tend to erode valve seats, pipe walls and other materials they contact. Solids of appreciable size can become lodged in orifices or valve seats and thereby restrict fluid flow and in some cases render a throttling valve, orifice, or choke bean totally useless. Debris can also accumulate in many low points in the flow line causing flow restrictions and influencing corrosion and erosion rates.

The flow control of fluids from geothermal steam wells is particularly sensitive to the problem of flowing debris. Due to the relatively high velocity of the fluids produced, more and larger solids are entrained and produced. For example, some steam wells produce from several pounds to about 100 pounds of debris in a month. Practical flow control and downstream equipment performance can not be maintained without removal of the debris.

However, since the energy value of the geothermal fluids resides in their high pressure and temperature, any solids separation must be done with a minimal or preferably no pressure drop or temperature change. The smaller conventional filters tend to fill rapidly in this service, consequently restricting flow and increasing pressure drop. Larger conventional filters take longer to fill but have a much larger heat exchange surface and therefore can result in an undesirably high heat loss.

U.S. Pat. No. 2,855,048 to Jones discloses a removable tubular guard for a choke bean in an oil well Christmas tree. Solids produced with the fluids from an oil well are prevented from entering the choke bean by the perforated cylindrical guard. The guard can be periodically removed for replacement or cleaning. However, accumulation of solids in the device restricts the fluid flow and the well must be blocked in to clean the tubular guard. U.S. Pat. No. 3,939,659 to Matthews discloses a down-hole fluid filter for removing solids from a stream of fluid injected into the well to drive a down-hole pump. The filter can be flushed by remote control and the flushed solids are transported from the well with the produced fluids. Neither of these devices are adapted to adequately handle the large quantity of debris produced from a geothermal well and, in fact, the device of Matthews permits the introduction of additional debris into the produced fluid stream. Tubular guards or conventional fluid screens would be shattered and/or clogged by the produced debris due to the large mass and velocities of the debris. A need exists for a simple but effective wellhead apparatus for flow control of wells producing fluids and debris.

It is an object of this invention to provide wellhead apparatus for controlling the flow of fluids from a well producing fluid and debris.

Another object of this invention is to provide wellhead apparatus for controlling the flow of fluids from a well also producing a large quantity of debris by separating the debris from the fluid and throttling the flow of the debris-free fluid.

Yet another object of this invention is to provide a device for separating and accumulating a large quantity of debris flowing with the fluids from a well, without significantly restricting the flow therethrough and without a large heat loss, and thereby reduce the amount of maintenance required to maintain the well in operation.

Still another object of this invention is to provide wellhead apparatus to control the flow of fluids from a geothermal steam well producing a large quantity of debris at high velocities, without a significant loss in fluid pressure or temperature during the separation of the debris from the fluids.

Other objects and advantages of this invention will become apparent to those skilled in the art from the following description taken in conjunction with the accompanying drawings.

SUMMARY OF THE INVENTION

Briefly, the invention provides a wellhead apparatus for controlling the flow of fluids from wells producing fluids and debris in which the debris and fluids are separated at the wellhead. The wellhead apparatus includes a novel accumulating device for receiving the well effluent and for separating the debris from the fluid with substantially no pressure drop and with a minimum of heat loss from the fluid stream.

More specifically, the accumulating device of the present invention includes an outer shell defining a debris accumulation chamber, an outlet conduit having a perforated end section disposed within the chamber, and access means to facilitate removal of the accumulated debris from the accumulation chamber. Fluids from the well flow into the accumulation chamber and pass freely into the outlet conduit while the debris is screened therefrom and collected in the accumulation chamber.

In a preferred embodiment, the accumulation chamber is of substantially larger diameter than the production tubing and the shell is provided with an eccentric expanding inlet section adapted for fluid tight connection to the wellhead apparatus. The outlet conduit is supported in the upper portion of the accumulation chamber, the end of the conduit is sealed by an angled end cap to deflect the debris downward, and the perforations in the section of the outlet conduit disposed within the accumulation chamber are dimensioned to screen out debris, but at the same time provide a total fluid flow area at least as large as the cross-sectional area of the outlet conduit. In this manner, fluid flow through the accumulation chamber into the outlet conduit occurs with a minimal pressure drop.

BRIEF DESCRIPTION OF THE DRAWINGS

The invention will be more readily understood by reference of the accompanying drawings, in which.

DETAILED DESCRIPTION OF THE INVENTION

Flow control of fluids from wells producing debris and fluids is complicated by the debris, which can erode the valve seats or orifice of the flow control choke means and can become lodged and restrict the flow therethrough. These problems exist, to some extent, in most production wells, but become acute in wells producing large quantities of fluids and debris. Conventional solids filters are subject to appreciable pressure drops and heat losses which in the case of wells producing oil or gas may be of little consequence but which are extremely detrimental to the ultimate power recovery efficiency in the case of geothermal steam and water wells. Furthermore, since the backflushing of most conventional filters requires either the shutting in of the well or by-passing of the filter, these filters are not suitable for use in geothermal wells where irreparable damage often results from a well shut in.

The wellhead apparatus of this invention overcomes these problems and is therefore particularly suited to flow control of geothermal wells.

Figure 1:
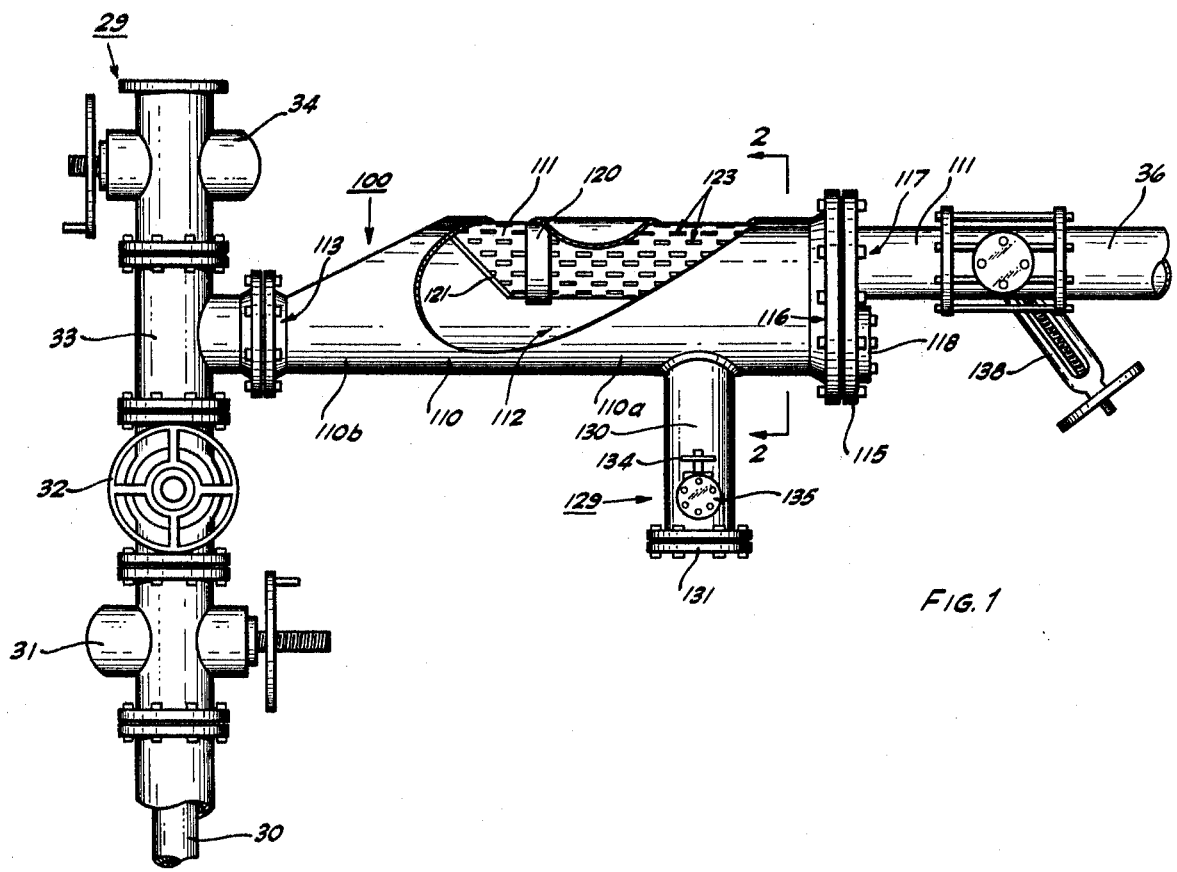
FIG. 1 is an elevation view of one embodiment of the wellhead apparatus of this invention with a portion cut away to show the interior of the accumulation chamber.

FIG. 1 illustrates one embodiment of a wellhead apparatus of this invention used to control the flow of fluids from a subterranean formation. Typically, production casing 30 is disposed in a well (not shown) and is in fluid communication with the subterranean formation (not shown) to convey production fluids from the reservoir to the wellhead apparatus shown generally as 29. Wellhead apparatus 29 includes valves 31 and 32 to shut in the well if required and a valve 34 to provide access to the well for work-over operations and other operations requiring venting of the well. Fluids from production casing 30 are diverted by a tee 33 and flow eventually through a flow line 36 to a pipeline, storage tank or other destination (not shown).

Figure 2:
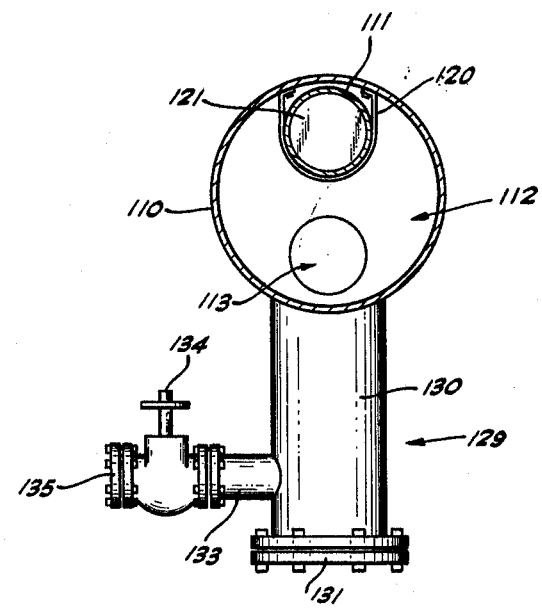
FIG. 2 is a cross-sectional view taken on line 2—2 of FIG. 1.

In the wellhead apparatus of this invention, an accumulating device, shown generally as 100, interconnects tee 33 with flow line 36. As is shown in FIGS. 1 and 2, device 100 includes an outer shell 110 removably connected to tee 33 and defining a chamber 112 for receiving the well effluent and accumulating the debris, outlet conduit 111 to receive debris-free fluids from chamber 112, and access means to facilitate removal of the accumulated debris from chamber 112.

In the preferred embodiment shown, elongated shell 110 includes a large diameter, right cylindrical section 110a and an integral, eccentric expanding inlet section 110b which define the chamber 112. The inlet section 110b expands from the small diameter inlet 113 having a center disposed below the center line of cylindrical section 110a to the diameter of section 110a and is adapted for fluid tight attachment to tee 33. The outlet end of the large diameter section 110a is closed by an eccentric reducing flange 115 which is provided with an outlet aperture 117 above the centerline of section 110a and an access aperture 116 closed by a cover plate 118.

Outlet conduit 111 extends through aperture 117 and into the upper portion of chamber 112, and is fixedly attached to flange 115 to provide a fluid tight seal. The section of conduit 111 within chamber 112 is supported by a hanger 120 and sealed by a plate 121. Plate 121 may be a perforated plate; however, a non-perforated plate is preferred. Preferably, plate 121 is a non-perforated plate attached to conduit 111 at an angle to deflect the debris downward, as shown. The walls of conduit 111 within chamber 112 have a plurality of perforations 123 which allow fluid communication between chamber 112 and conduit 111, but prevent passage of the debris from the accumulation chamber. Preferably, outlet aperture 117 and hanger 120 are located so as to position conduit 111 in the upper portion of accumulation chamber 112, as shown. In this described alignment, separation of the debris occurs primarily because the fluids are displaced vertically in passage from the inlet to the outlet, while the debris, having a greater inertia than the fluid, is not diverted substantially but rather continues in a relatively straight path to strike against reducing flange 115 and drop to the bottom of accumulation chamber 112.

A debris collection boot, shown generally as 129, can be provided to facilitate the removal of debris from chamber 112. Boot 129 includes a right cylindrical section 130 communicating with the bottom of chamber 112 and closed by a blind flange 131. Boot 129 is provided with a blowdown conduit 133 fitted with a valve 134. An optional blind flange 135 may be provided to prohibit leakage past valve 134. The debris separated from the fluids accumulates in boot 129 and the bottom of chamber 112. The accumulation of debris can be removed by opening valve 134 to vent the fluids to the atmosphere, in the case of a steam well, or into a blowdown line (not shown), and then removing flange 131, if necessary, to dump any remaining debris. If required, cover plate 118 can be removed for direct access into chamber 112. The accumulation of debris usually can be removed without bypassing device 100 and without shutting in the well by venting the debris through valve 134.

FIG. 2 most clearly illustrates the spatial relationship of the elements of a preferred embodiment of device 100. The axes of section 110a of shell 110 and outlet conduit 111 are substantially parallel and horizontal and are in the same vertical plane as the center of inlet 113. The axis of outlet conduit 111 is displaced above the axis of shell 110 and the center of inlet 113 is displaced below it. In this preferred arrangement, the vertical displacement of the fluid in flow through the device contributes substantially to separation of the debris and it is apparent that a very large quantity of debris could be accumulated before the same would interfere with fluid flow into conduit 111. As illustrated, inlet 113 and outlet conduit 111 have substantially the same cross-sectional area.

The flow rate of the debris-free fluids from outlet conduit 111 into flow line 36 is controlled by a valve 138. Although a valve is shown as the flow control choke, any of the conventional choke devices can be employed in the wellhead apparatus of this invention. Suitable choke devices include throttling valves, choke beans, venturi tubes, orifices and other flow control devices. The suitability of a particular choke depends on the type and temperature of fluids, the flow rate and pressure ranges and the external environmental conditions, as is well known to those skilled in the art. In controlling the flow from a geothermal steam well, Fisher vee-ball valves have been found to be effective when used in the wellhead apparatus of this invention.

While shell 110 can be of any desired shape and size, cylindrical shapes are preferred from the standpoint of ease of manufacture and high bursting strength. The accumulation chamber should be large enough to accommodate at least a large fraction of the monthly production of debris without affecting the fluid flow therethrough. However, from a cost and heat loss standpoint, the shell should not be too large. One such device, substantially as illustrated in FIG. 1 with inlet 113 and outlet conduit 111 being of 10 inches in diameter, is about 60 inches in length by 24 inches in diameter and effectively accumulates approximately 15 cubic feet of debris without restricting the fluid flow from a geothermal steam well.

The perforations in the outlet conduit may be of practically any shape, including circular perforations or long, thin slots, provided they are dimensioned to prevent the passage of debris. For example, 2½ × ⅛ inch slots have been found to be effective. A sufficient number of the perforations are provided to have a total flow area at least as large as the cross-sectional area of the outlet conduit, in order that flow through the perforated conduit does not cause a substantial pressure drop. Preferably, the total flow area provided by the perforations is 1.5 to 5 times the cross-sectional area of the outlet conduit.

For use in controlling the flow of fluids from a geothermal well, it is preferred that the wellhead apparatus be suitably insulated to restrict the heat loss to a minimum.

While particular embodiments of the invention have been described, it will be understood, of course, that the invention is not limited thereto since many obvious modifications can be made, and it is intended to include within this invention any such modification as will fall within the scope of the appended claims.

Having now described the invention, we claim:

1. A debris separating device for separating and accumulating debris flowing with fluids produced from a well, which comprises:
    a first conduit defining an accumulation chamber having a substantially horizontal axis;
    adaptor means to provide fluid tight communication between said first conduit and said well and defining an inlet for receiving the fluids and debris from said well, said inlet having a smaller cross-sectional area than said first conduit;
    closure means for sealing the outlet end of said first conduit and defining an outlet aperture of a smaller cross-sectional area than said first conduit;
    a second conduit extending through said outlet aperture and into said chamber, said second conduit including a perforated section disposed within said chamber to provide fluid communication between said second conduit and said chamber and to prevent passage therebetween of said debris; and
    access means communicating into said accumulation chamber to facilitate the periodic removal of accumulated debris from said chamber.

2. The apparatus defined in claim 1 wherein said access means includes a boot and a pair of normally closed access apertures.

3. The apparatus defined in claim 1 wherein the axis of said second conduit is substantially parallel to the axis of said accumulation chamber.

4. The apparatus defined in claim 3 including means for supporting said perforated section of said second conduit within said accumulation chamber such that the axis of said second conduit is in the same vertical plane and above the axis of said accumulation chamber.

5. The apparatus defined in claim 1 wherein said inlet and said second conduit have substantially the same cross-sectional area and said perforations of said second conduit are dimensioned to prevent the passage therethrough of said debris but provide a fluid flow area of at least the cross-sectional area of said second conduit.

6. A debris separating device for separating and accumulating debris flowing with fluids produced from a well, which comprises:
    an outer shell defining an accumulation chamber, said shell including a large diameter, right cylindrical pipe section having a first substantially horizontal axis and an integral, eccentric expanding inlet section in fluid tight communication with said well for receiving the fluids and debris from said well, said inlet section having a circular inlet of reduced diameter and with a center displaced below said first axis;
    closure means for sealing the outlet end of said shell and defining and eccentric circular outlet aperture of reduced diameter having a center displaced above said first axis;
    a small diameter, right cylindrical outlet pipe in fluid tight communication with said chamber through said outlet aperture for withdrawing fluids therefrom and having a second substantially horizontal axis in the same vertical plane and above said first axis, said outlet pipe including a perforated section disposed within said chamber to provide fluid communication between said outlet pipe and said chamber, the perforations of said perforated section being dimensioned to prevent passage therethrough of said debris, but provide a total fluid flow area of at least the cross-sectional area of said outlet pipe; and
    at least one, normally closed, access aperture communicating into said accumulation chamber to facilitate periodic removal of the accumulated debris from said chamber.

7. Wellhead apparatus for controlling the flow of fluids from a subterranean formation which produces fluids and debris, comprising:
    a well communicating with said formation to convey said fluids and debris to the earth surface;
    a first conduit defining an accumulation chamber having a substantially horizontal axis;
    adaptor means to provide fluid tight communication between said first conduit and said well and defining an inlet for receiving the fluids and debris from said well, said inlet having a smaller cross-sectional area than said first conduit;
    closure means for sealing the outlet end of said first conduit and defining an outlet aperture of a smaller cross-sectional area than said first conduit;
    a second conduit extending through said outlet aperture and into said chamber, said second conduit including a perforated section disposed within said chamber to provide fluid communication between second conduit and said chamber and to prevent passage therebetween of said debris;
    choke means mounted on said second conduit for regulating the flow of fluids therethrough; and
    access means communicating into said accumulation chamber to facilitate the periodic removal of accumulated debris from said chamber.

8. The apparatus defined in claim 7 wherein said access means includes a boot and a pair of normally closed access apertures.

9. The apparatus of claim 7 wherein the axis of said second conduit is substantially parallel to the axis of said accumulation chamber.

10. The apparatus of claim 9 including means for supporting said perforated section of said second conduit within said accumulation chamber such that the axis of said second conduit is in the same vertical plane and above the axis of said accumulation chamber.

11. The apparatus of claim 7 wherein said inlet and said second conduit have substantially the same cross-sectional area and said perforations of said second conduit are dimensioned to prevent the passage therethrough of said debris but provide a fluid flow area of at least the cross-sectional area of said second conduit.

12. Wellhead apparatus for controlling the flow of steam from a subterranean geothermal formation which produces steam and debris, comprising:
- a well communicating with said formation to convey said steam and debris to the earth surface;
- an outer shell defining an accumulation chamber, said shell including a large diameter, right cylindrical pipe section having a first substantially horizontal axis and an integral, eccentric expanding inlet section in fluid tight communication with said well for receiving the steam and debris from said well, said inlet section having a circular inlet of reduced diameter and with a center displaced below said first axis;
- closure means for sealing the outlet end of said shell and defining an eccentric circular outlet aperture of reduced diameter having a center displaced above said first axis;
- a small diameter, right cylindrical outlet pipe in fluid tight communication with said chamber through said outlet aperture for withdrawing steam therefrom and having a second substantially horizontal axis in the same vertical plane and above said first axis, said outlet pipe including a perforated section disposed within said chamber to provide fluid communication between said outlet pipe and said chamber, the perforations of said perforated section being dimensioned to prevent passage therethrough of said debris, but provide a total fluid flow area of at least the cross-sectional area of said outlet pipe;
- a valve mounted on said outlet pipe for regulating the flow of fluids therethrough; and
- at least one, normally closed, access aperture communicating into said accumulation chamber to facilitate periodic removal of the accumulated debris from said chamber.

* * * * *